US008315966B2

(12) United States Patent
Narain et al.

(10) Patent No.: US 8,315,966 B2
(45) Date of Patent: Nov. 20, 2012

(54) SCALABLE AND INTERACTIVE METHOD OF GENERATING AND MODIFYING NETWORK CONFIGURATIONS TO ENFORCE COMPLIANCE WITH HIGH-LEVEL REQUIREMENTS

(75) Inventors: Sanjai Narain, Madison, NJ (US); Gary Levin, Bedminster, NJ (US); Vikram Kaul, Randolph, NJ (US); Rajesh Talpade, Madison, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 633 days.

(21) Appl. No.: 12/268,223

(22) Filed: Nov. 10, 2008

(65) Prior Publication Data
US 2009/0265296 A1    Oct. 22, 2009

Related U.S. Application Data

(60) Provisional application No. 61/002,319, filed on Nov. 8, 2007.

(51) Int. Cl.
    *G06F 17/00* (2006.01)
    *G06F 15/18* (2006.01)
    *G06F 9/455* (2006.01)
    *G06E 1/00* (2006.01)
(52) U.S. Cl. ............... 706/47; 706/5; 706/19; 716/106
(58) Field of Classification Search .......... None
    See application file for complete search history.

(56) References Cited

U.S. PATENT DOCUMENTS
2006/0184342 A1* 8/2006 Narain ............... 703/2

OTHER PUBLICATIONS
Mitel Corporation, The SME Server Developer's Guid, May 2006, 1.50, pp. 15 and 33.*
Takano, Generalized Partial Computation using Disunification to Solve Constraints, 1993, Conditional Term Rewriting Systems, vol. 656/1993, 444-448.*
Torlak et al., Kodkod for Alloy Users, Nov. 2006, First Alloy Workshop, pp. 1-5.*
Milošević et al., Quantifier Elimination—Algorithms and Applications, 2004, pp. 1-8.*

* cited by examiner

Primary Examiner — Alan Chen
Assistant Examiner — Paulinho E Smith
(74) Attorney, Agent, or Firm — Philip J. Feig

(57) ABSTRACT

A system and method provides a solution to the problem of applying end-to-end requirements of connectivity, security, reliability and performance to configure a network and ultimately assign network components to the network. All requirements are modeled as constraints and a constraint solver does the resolution. Not every constraint to be solved is solved by the model-finder. Instead, we "factor away" subsets of a constraint that can be efficiently solved via a special-purpose constraint solver, such as an SQL/Prolog engine, linear programming system, or even an algorithm, leaving behind a constraint that truly requires the power of model-finding, and that is often efficiently solvable by existing model-finders. Such constraints are compiled into quantifier-free constraints that are Boolean combinations of constraints of two forms x=y and x=c where x, y are variables and c is a constant. Such constraints can be efficiently solved by modern SAT-based model-finders. The system intelligently removes the quantifiers instead of having the model-finder remove the quantifiers. An "unsatisfiability-core" analysis efficiently guides the search for configurations to change to restore consistency.

8 Claims, 3 Drawing Sheets

SCALABLE AND INTERACTIVE METHOD OF GENERATING AND MODIFYING NETWORK CONFIGURATIONS TO ENFORCE COMPLIANCE WITH HIGH-LEVEL REQUIREMENTS

CROSS-REFERENCE TO RELATED APPLICATIONS

This application claims the benefit of the filing date of U.S. Provisional Patent Application No. 61/002,319, filed Nov. 8, 2007, the disclosure of which is hereby incorporated herein by reference.

GOVERNMENT LICENSE RIGHTS

This invention is based upon work supported by U.S. Government Disruptive Technology Office (now IARPA) under NICECAP Program contract FA8750-07-C-0030.

FIELD OF THE INVENTION

The present invention relates generally to IP network configuration management. Specifically, the present invention relates to the elimination of vulnerabilities in cyber infrastructure due to configuration errors and the reduction of the time required to compute correct configurations satisfying end-to-end cyber infrastructure connectivity, security, reliability, and performance requirements.

BACKGROUND OF THE INVENTION

The present invention provides a solution to the problem of applying end-to-end requirements of connectivity, security, reliability and performance to configure a network and ultimately assign network components to the network.

Network vulnerabilities due to configuration errors include reduced reliability for example because a backup link would not work since HSRP was misconfigured. Other vulnerabilities include: compromised security for example resulting from an unintended backdoor; SPoF across layers due to multiple virtual links mapped to the same physical interface; regulatory non-compliance such as an intended IPSec tunnel was not used due to a routing configuration error or an actual path did not protect customer data; or poor quality of service such as inconsistent QoS configurations on routers and switches impacting VoIP.

The present invention models all requirements as constraints and a constraint solver does the resolution. Sample requirements are: IPSec where IPSec tunnels are replicated at each router in a cluster; Static Routing where if an IPSec tunnel protects a packet, there is a static route for the packet into the tunnel; Firewalls where is an IPSec tunnel protecting a packet, every firewall permits the packet; and Dynamic Routing where RIP is not enabled on any node at which an IPSec tunnel originates.

The existing methods of solving the problem of eliminating vulnerabilities have led to several problems. First, how to scalably generate network component configurations compliant with high-level requirements of security, connectivity, performance and reliability. Second, if configurations are known but are non-compliant with the requirements, then how should the configurations be changed to enforce compliance.

One prior solution to solve the first problem is described by Sanjai Narain in U.S. patent application Ser. No. 11/284,368 entitled "Network Configuration Management by Model-Finding". The application discloses formalizing high-level requirements as first-order logic network constraints and then solving these requirements using a SAT-solver-based model-finder. MIT's model-finders Alloy and Kodkod were used.

The model-finding approach does not scale to networks of realistic scale and complexity. This is because the process of compiling first-order logic constraint into Boolean form leads to very large intermediate constraints. For example, a constraint of the form "for all x1, for all x2, . . . , for all xk. $P(x1, \ldots, xk)$ has at least $N^k$ distinct instances where N is the lower-bound on the size of the sets over which $x1, \ldots, xk$ can range. For realistic networks, N can be 1000 and k can be 4 leading to $10^{12}$ instances. This number of instances is far more than what modern model-finders can handle.

There are currently no known solutions to the second problem.

There are no systematic solutions to the second problem. Systems like the one described by R. R. Talpade et al in U.S. patent application Ser. No. 11/900,674 entitled "IP Network Vulnerability and Policy Compliance Assessment by IP Device Configuration Analysis" only evaluate whether configurations are compliant with requirements but do not offer any way of changing the configurations to enforce compliance.

BRIEF SUMMARY OF THE INVENTION

In order to overcome the problems and limitations of the known prior methods, we solve the first problem by not forcing every constraint to be solved via the model-finder. Instead, we "factor away" subsets of a constraint that can be efficiently solved via a special-purpose constraint solver, such as an SQL/Prolog engine, linear programming system, or even an algorithm, leaving behind a constraint that truly requires the power of model-finding, and that is often efficiently solvable by existing model-finders. The Dynamic System Configuration Assurance System of the present invention, sometimes hereinafter referred to as ConfigAssure, compiles such constraints into quantifier-free constraints that are Boolean combinations of constraints of two forms $x=y$ and $x=c$ where x, y are variables and c is a constant. Such constraints can be efficiently solved by modern SAT-based model-finders. In particular, ConfigAssure intelligently removes the quantifiers instead of having the model-finder remove the quantifiers.

In order to solve the second problem we use "unsatisfiability-core" analysis to efficiently guide the search for configurations to change to restore consistency.

The novelty of the present invention resides in exploiting the power of modern SAT solver-based model finders, supported by pre-processing the constraints into QFFs to manage scalability. SAT solvers are tools that can solve millions of Boolean constraints in millions of variables in seconds. Network security requirements, for example, are expressed as constraints on configuration parameters that are then solved to compute their values. By representing both security and functionality requirements as constraints, the tension between these is automatically resolved. If constraints are unsolvable, the proof of unsolvability provides a systematic method of diagnosing and fixing configuration errors. Model-finders are tools that allow constraint specification in an intuitive and expressive first-order logic language, compile these into Boolean logic, solve these with a SAT solver, and then reflect results back into first-order logic. A key challenge of the present approach is scalability. The present approach succeeds because we have developed a new method of suppressing generation of very large intermediate constraints in the translation of first-order logic into Boolean. The idea is to "factor away" subsets of constraints that can be solved via specialized constraint solvers, leaving behind a constraint that truly requires the power of model finding via SAT. This allows for the solution of configuration problems for cyber infrastructure of realistic scale and complexity.

The model-finder we used is Kodkod, the Java-based API underlying another model-finder called Alloy. The SAT solvers we have used are MiniSatProver and ZChaff.

While evaluating compliance of configurations to requirements is difficult, it is more difficult to change configurations to enforce compliance. Changing a configuration to ensure compliance with a currently unsatisfied requirement may make that configuration non-compliant with a previously satisfied requirement. Thus, a global constraint satisfaction problem has to be solved. Efficient methods of doing so are difficult. While current SAT-based model-finders are well-engineered, they do not scale up with straightforward formalization of constraints. The present invention provides a new method of formalizing and transforming requirements so that current model-finders do scale to networks of realistic scale and complexity.

The present invention will more clearly be understood when the following description is read in conjunction with the accompanying drawings.

DETAILED DESCRIPTION

The above problems are solved in accordance with the present invention in the following manner. In order to solve the first problem, every constraint is not forced to be solved via the model-finder. Instead, subsets of a constraint that can be efficiently solved using a special purpose constraint solver, such as an SQL/Prolog engine, linear programming system, or even an algorithm are "factored away", leaving behind a constraint that truly requires the power of model-finding, and that is often efficiently solvable by existing model-finders. ConfigAssure compiles such constraints into quantifier-free constraints that are Boolean combinations of constraints of two forms x=y and x=c where x, y are variables and c is a constant. Such constraints can be efficiently solved by modern SAT-based model-finders. In particular, ConfigAssure intelligently removes the quantifiers instead of having the model-finder remove these.

That is, suppose one of the constraints to be solved is "for all x. p(x) implies q(x)" where x ranges over a set R. The model-finder will generate one instance of the implication for every value of x in R before submitting these to a SAT solver. If R is large, the number of instances will also be large. The present invention uses an SQL/Prolog engine to compute the set S of those x for which p is true or unknown, and generates instances of q for just these values. For all other values of x, the constraint is trivially true (the antecedent of the implication is false). The size of S could be much smaller than that of R.

In order to solve the second problem, "unsatisfiability-core" analysis is used to efficiently guide the search for configuration parameters to change to restore consistency.

Figure 1:
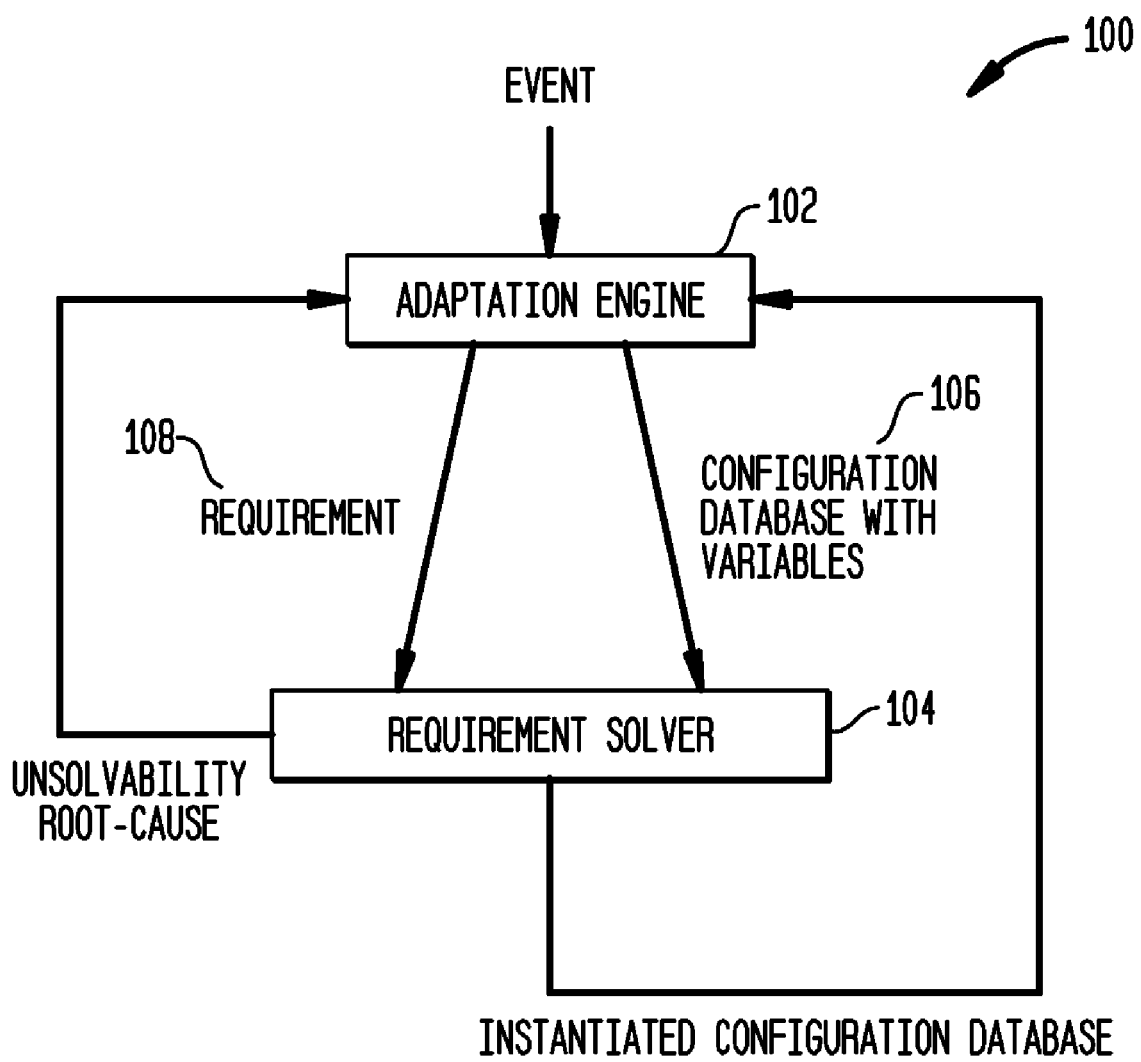
FIG. 1 is a schematic representation of a system architecture of the present invention.

FIG. 1 is a schematic representation of the ConfigAssure system architecture 100. The ConfigAssure architecture includes two main components: the Adaptation Engine 102 and the Requirement Solver 104. While the Requirement Solver is the "brains" behind the ConfigAssure system, it is driven by another component called the Adaptation Engine 102. The Adaptation Engine responds to events such as a request by the user to satisfy a new requirement, or information about an attack. The Adaptation Engine examines the current configuration database and then outputs two items. The first is a configuration database with variables 106. This is derived from the current database by replacing zero or more constants in it by variables and by adding new tuples containing zero or more variables. These variables represent the configuration parameters whose values need to be found in order to respond to the event. The second item output by the Adaptation Engine is a Requirement 108 that needs to be satisfied to respond to the event. These two items are input to the Requirement Solver 104 that attempts to find a solution. The solution is a set of the form $\{x_1=c_1, \ldots x_k=c_k\}$ where each $x_i$ is a configuration variable and each $c_i$ is a constant. The solution is such that when configuration variables are replaced by associated values, a concrete database is obtained that satisfies the Requirement 108.

If a solution cannot be found, the Requirement Solver computes a proof of unsolvability. This proof is a set of low-level constraints that are also unsolvable. Typically, this set is much smaller than the set of low-level constraints generated for Requirement 108. If the proof contains a constraint of the form x=c then relaxing the constraint that x should equal c, is a good heuristic for restoring solvability. The Adaptation Engine 102 generates a new Requirement 108 from which x=c is removed and the Requirement Solver 104 attempts solution again. If no further relaxation is possible, then the Requirement Solver exits with failure.

Figure 2:
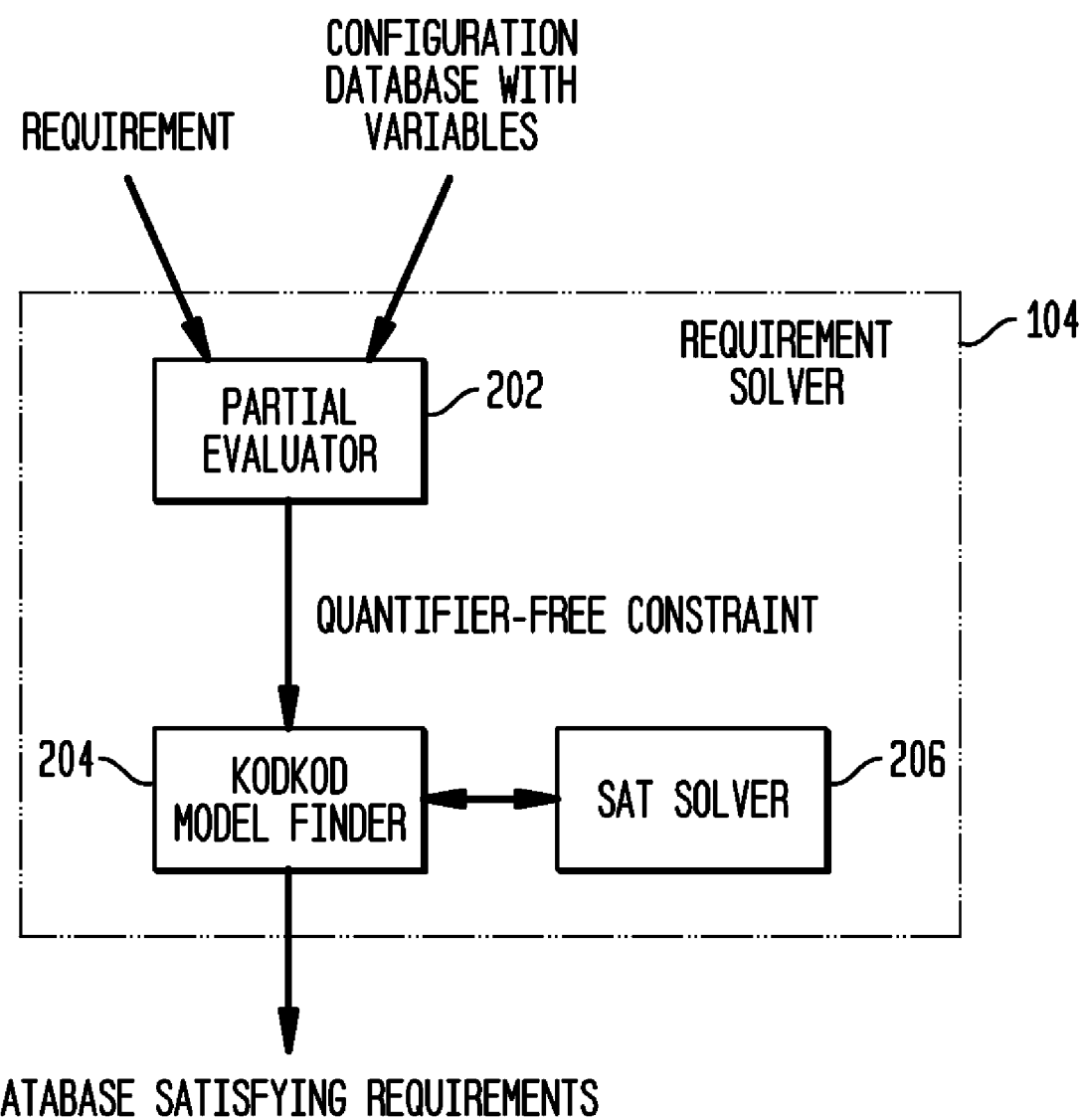
FIG. 2 is a schematic diagram of a Requirement Solver.

The Requirement Solver 104 shown in FIG. 2 preferably comprises three subcomponents: the Partial Evaluator 202, the Kodkod model Finder 204, and SAT Solver 206. The Partial Evaluator takes as input a Requirement and a Configuration Database with Variables. It produces as output a Quantifier-Free Form constraint which is the type of constraints that the Kodkod model finder can accept as inputs. The Kodkod model finder takes the Quantifier-Free Form constraints and with the help of the SAT solver computes a database satisfying the requirements.

The Configuration Database is based on a finite set of configuration variables and constants. A subset of constants is of type integer, and a subset of variables can only take on integer values. A configuration database is a finite set of tuples whose relation symbol specifies a configuration parameter and whose fields can contain variables.

As previously mentioned, the novelty of the invention lies in exploiting the power of modern Boolean satisfiability (SAT) solvers such as ZChaff and MiniSatProver. These can solve millions of constraints in millions of variables in seconds. The goal of propositional logic satisfiability (also referred to as Boolean Satisfiability and abbreviated as SAT) is to find an assignment to the variables of a propositional logic formula (also referred to as a Boolean formula) such that this formula evaluates to 1 (or true), or prove that no such assignment exists. This problem is the first established NP-complete problem. For n Boolean variables, there are $2^n$ possible truth assignments to be checked.

The modern SAT solver-based model finders are the basis of a key component of our solution called the Requirement Solver. The Requirement Solver takes as input a Configuration Database with Variables DBV, and a Requirement R on it, and produces as output a set of values for the variables. This set is such that when variables in DBV are replaced by their values, the resulting variable-free database satisfies R. Each variable represents a configuration parameter whose value has to be computed.

A number of fundamental configuration problems, for bridging the gap between requirements and configurations, can be solved via the Requirement Solver:

Specification: All requirements are expressed as constraints on configurations. A constraint is a unifying concept. Requirements on security, functionality, performance and reliability can all be naturally regarded as constraints.

Configuration synthesis: The Requirement Solver generates configurations satisfying the requirements as the output. This method provides the very important advantage of compositionality. Given requirements A and B, if the Solver computes a solution to (A^B) the solution is guaranteed to satisfy both A and B. Compositionality is not guaranteed with procedural approaches. If B is enforced after A is, then A may well become false. The configurations for B may overwrite those for A. Compositionality automatically resolves the tension between security and functionality. If a solution satisfying both requirements exists, it is found. This is in stark contrast to procedural approaches where this tension has to be manually resolved by the procedural policy writer.

Defense hardening: An interesting way to think about defense hardening is increasing the number of defensive layers each represented as a requirement. Constraint increase or strengthening is easily implemented via the Requirement Solver. If the system currently satisfies constraint R but now has to satisfy S, the Requirement Solver can find a solution to R^S.

Configuration error diagnosis: If a requirement is unsolvable, the Solver computes a proof of unsolvability as a set of primitive constraints that is also unsolvable. Typically, this set is drastically smaller than the set of primitive constraints generated for the original requirement. If it contains a constraint of the form x-c where x is a configuration variable and c a constant, then x=c becomes a useful root cause.

Configuration error fixing: If a constraint x=c is found in the proof of unsolvability, then a good heuristic for restoring solvability is to drop this constraint from the original requirement and retry.

Configuration synthesis with acceptable cost: The cost of changing a configuration and keeping the cost of all changes below a threshold can be formalized within ConfigAssure. By binary search, a solution with approximately minimum cost can be computed.

Figure 3:
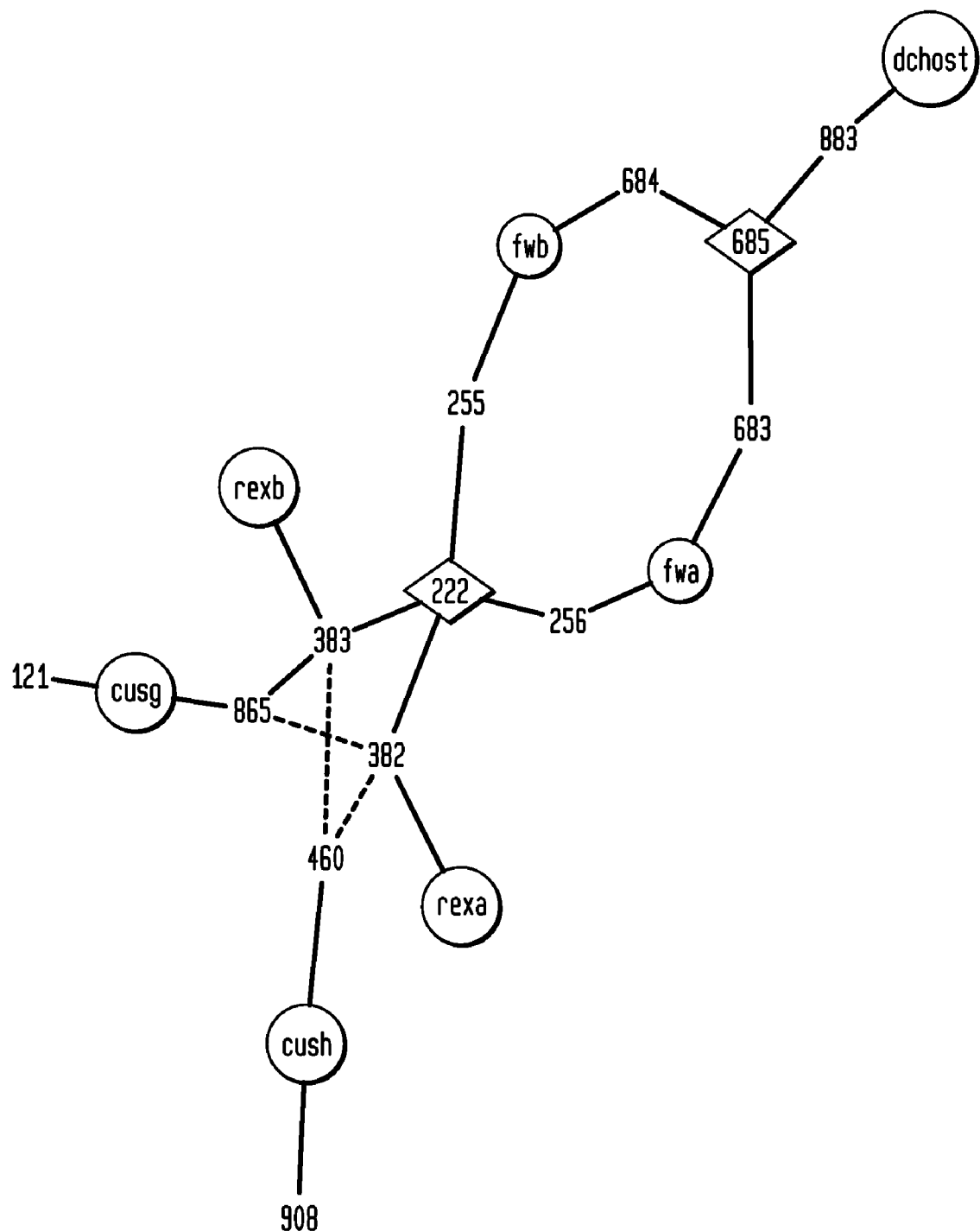
FIG. 3 schematically illustrates a simplified version of a data center.

Applying the invention to a specific example, in FIG. 3 there is a simplified version of a data center. Clients with IP addresses 121 and 908 behind customer gateway routers cusg and cush respectively securely communicate with a server dchost with IP address 883, in the data center. Security is accomplished via IPSec tunnels between data center gateway routers rexa and rexb and cusg and cush. Firewalls need to ensure that only traffic between clients and servers is allowed to pass. Gateway routers need to replicate IPSec tunnels for fault-tolerance. They also need to contain static routes to ensure that traffic flowing to customer sites is directed only into IPSec tunnels. A more precise description is now provided.

System configuration is represented as set of tuples, each of one of the following forms:

ipSecTunnel(SourceAddress, DestinationAddress, EncryptionAlgorithm, HashAlgorithm, Key, AgencyName)

ipAddress(Node, Interface, Address, SubnetID)

staticRoute(Node, DestinationAddress, Mask, NextHopAddtess).

fw(Node, SourceAddress, DestinationAddress, Port, Protocol, Permission)

hsrp(Node, RealAddress, Group, VirtualAddress)

acl(Node, AgencyName, SourceAddress, DestinationAddress, Protocol, Port)

rip(Address)

IPSec constraints are:
  IPSec tunnels are replicated at each router in HSRP cluster Static Routing constraints are:
  If an IPSec tunnel protects a packet, there is a static route that directs it into the tunnel
  There is a static route to the remote end point of every IPSec tunnel Dynamic routing constraints are:
  RIP is not enabled on any node at which an IPSec tunnel originates Firewall constraints are:
  Both firewalls have the same entries A correct datacenter configuration satisfying above constraints is:

```
ipSecTunnel(382, 865, 'esp-3des', 'esp-md5-hmac', xxx, cusg).
ipSecTunnel(382, 460, 'esp-3des', 'esp-md5-hmac', xxx, cush).
ipSecTunnel(383, 865, 'esp-3des', 'esp-md5-hmac', xxx, cusg).
ipSecTunnel(383, 460, 'esp-3des', 'esp-md5-hmac', xxx, cush).
acl(rexa, cusg, 883, 121, tcp, 80).
acl(rexa, cush, 883, 908, tcp, 80).
acl(rexb, cusg, 883, 121, tcp, 80).
acl(rexb, cush, 883, 908, tcp, 80).
staticRoute(rexa, 865, 667, 445).
staticRoute(rexa, 121, 667, 445).
staticRoute(rexa, 460, 667, 445).
staticRoute(rexa, 908, 667, 445).
staticRoute(rexb, 865, 667, 445).
staticRoute(rexb, 121, 667, 445).
staticRoute(rexb, 460, 667, 445).
staticRoute(rexb, 908, 667, 445).
hsrp(rexa, 382, '21', 386).
hsrp(rexb, 383, '21', 386).
rip(752).
rip(779).
rip(16).
fw(fwa, 883, 121, tcp, 80, permit).
fw(fwa, 883, 908, tcp, 80, permit).
fw(fwb, 883, 121, tcp, 80, permit).
fw(fwb, 883, 908, tcp, 80, permit).
ipAddress(fwa, ce0, 683, 685).
ipAddress(fwa, bge0, 256, 222).
ipAddress(fwb, ce0, 684, 685).
ipAddress(fwb, bge0, 255, 222).
ipAddress(rexa, 'FastEthernet0/1', 382, 222).
ipAddress(rexb, 'FastEthernet0/1', 383, 222).
ipAddress(dchost, 'FastEthernet0/1', 883, 685).
```

Having described the system, the method is implemented as follows:

Guiding principle: Constraint partial evaluation.

All constraints on finite domains can be solved via model finding/SAT.

However, large subsets can be much more efficiently solved by special-purpose constraint solvers such as database engines, linear programming systems, and algorithms.

"Factoring away" this subset leaves behind only that subset that truly requires the power of model finding/SAT. This can dramatically improve the scalability: FOL→Boolean compilation and solution of Boolean.

For example, consider (x). p(x)→q(x). If for a value x, say x0, p(x0) can be determined to be false, via e.g., a database engine, then p(x0)→q(x0) need not be generated, or at least replaced by "true".

But other patterns are not so obvious.

All tuples, including those containing configuration variables, are modeled as Prolog facts. A Prolog predicate called eval(Spec, QFF) is defined where Spec is the name of a constraint and QFF is a quantifier-free constraint or form. A QFF is a Boolean combination of two primitive forms: x=y and x=c, where x and y are configuration variables and c is a constant. The meaning of eval is that if QFF is true if and only if Spec is true. Thus, if configuration variables were replaced by values in any solution of QFF then Spec would become true of the system configuration. QFF can be solved via Alloy/Kodkod. This idea is illustrated by the following tiny set of tuples:

```
ipSecTunnel(382, 865, 'esp_3des', 'esp_md5_hmac', xxx, cusg).
ipSecTunnel(383, dest(0), 'esp_3des', 'esp_md5_hmac', xxx, cusg).
hsrp(rexa, 382, '21', 386).
hsrp(rexb, 383, '21', 386).
```

The only requirement to be enforced is IPSec Constraint 1. This is named all_ipsec_cloned_at_hsrp, The Prolog call eval (all_ipsec_cloned_at_hsrp, C) returns a constraint that, when translated into Alloy, is:

```
pred test [ ] {
    (c_865=solution.dest_0&&
    ((solution.dest_0=c_865=>
    solution.dest_0=solution.dest_0)&&
    (solution.dest_0=solution.dest_0=>
    solution.dest_0=c_865)))}
```

All configuration variables are modeled as attributes of a single object called solution:

one sig solution {dest_0:netcon}

For now, each configuration variable is of one type, netcon, representing all the constants in system configuration. Constants are declared as follows:

```
sig netcon { }
one sig c_21 extends netcon{ }
one sig c_382 extends netcon{ }
one sig c_383 extends netcon{ }
one sig c_386 extends netcon{ }
one sig c_865 extends netcon{ }
one sig c_cusg extends netcon{ }
one sig c_esp_3des extends netcon{ }
one sig c_esp_md5_hmac extends netcon{ }
one sig c_rexa extends netcon{ }
one sig c_rexb extends netcon{ }
one sig c_xxx extends netcon{ }
```

When test is run in Alloy, it returns the value of dest(0) as 865.

Implementing eval(all_ipsec_cloned_at_hsrp, C). In order to compute C such that eval(all_ipsec_cloned_at_hsrp, C), Prolog generates an hsrp_ipsec_tuple [A1, A2, D, EA, HA, K, F] such that A1, A2 are second fields in an HSRP tuple, and D, EA, HA, K, F are the last five fields of an IPSec tuple. It then recursively generates the following constraints:

C1: for A1, A2 to be in an HSRP group
C2: for a tunnel with parameters D, EA, HA, K, F to originate at A1
C3: for a tunnel with parameters D, EA, HA, K, F to originate at A2

Finally, it forms the constraint implies (and(C1, C2), C3). It generates such a constraint for each hsrp_ipsec_tuple, forms the conjunction of these, and returns this as C.

Considerable control is exercised over the size of C for the following reason: for most of the hsrp_ipsec_tuples, the requirement can be evaluated to be true or false, directly by Prolog. If for even a single tuple, the requirement is false, C is simply false. If for a tuple, the requirement is true, then no constraint need be generated, except the constraint true, but even that can be removed in a post-processing stage. If for a tuple, the requirement cannot be evaluated as true or false by Prolog, a constraint is generated. The Prolog code is:

```
eval(all_ipsec_cloned_at_hsrp, C):-!,
    findall(Cond, Tuple^(hsrp_ipsec_tuple(Tuple),
    eval(ipsec_cloned_at_hsrp(Tuple), Cond)), Set),
    andEach(Set, C). % Form the conjunction of all conditions in Set
hsrp_ipsec_tuple([A1, A2, D, EA, HA, K, F]):-
    hsrp(_, A1, _, _),
    hsrp(_, A2, _, _),
    ipSecTunnel(_, D, EA, HA, K, F).
eval(ipsec_cloned_at_hsrp([A1, A2, D, EA, HA, K, F]), Cond):-!,
    eval(hsrp(A1, A2), C1),
    eval(ipsec(A1, D, EA, HA, K, F), C2),
    eval(ipsec(A2, D, EA, HA, K, F), C3),
    implies(and(C1, C2), C3),
    simplify_r(C3, Cond).
implied(hsrp(A1, A2), C):-
    check([not(A1=A2)], C1),
    hsrp(_, X1, G1, V1),
    check([A1=X1], C2),
    hsrp(_, X2, G2, V2),
    check([A2=X2, not(X1=X2), G1=G2, V1=V2], C3),
    andEach([C1, C2, C3], D),
    simplify_r(D, C).
implied(ipsec(A, B, C, D, E, F), Cond):-
    ipSecTunnel(P, Q, R, S, T, U),
    check([A=P, B=Q, C=R, D=S, E=T, F=U], Cond).
eval(C, D):-
    findall(X, implied(C, X), S),
    orEach(S, D). % Form the disjunction of all conditions in S.
% check takes as input a list L of constraints of the form X=Y and not(X=Y). If a constraint can be directly
% evaluated, it drops it from the list, otherwise retains it. Finally, it returns a conjunction of all remaining
% constraints.
check(L, M):-
    check_1(L, LC),
    andEach(LC, M).
check_1([ ], [ ]):-!.
check_1([U=V | Z], Rest):-
    atomic(U),
    atomic(V),!,
    U=V,
    check_1(Z, Rest).
check_1([not(U=V) | Z], Rest):-
    atomic(U),
    atomic(V),!,
    \+U=V,
    check_1(Z, Rest).
check_1([Cond | Z], [Cond|Rest]):-
    check_1(Z, Rest).
```

Implementing eval(all_firewall_rules_identical_fwa_fwb, C). A dramatic reduction in the size of generated constraints is achieved when evaluating the Firewall constraint that all entries on fwa and fwb should be identical. In the 'large.pro' file, there are 929 entries for each firewall. Suppose we replace the first entry for fwa with the tuple:

fw(fwa, s(1), d(1), tcp, 80, permit).

Prolog generates the Alloy constraint:

```
pred test [ ] {
    ((c_197=solution.s_1&&
    c_88=solution.d_1)&&
    (solution.s_1=c_197&&
    solution.d_1=c_88))}
```

This is because 197 and 88 are the second and third fields in an entry for fwb. The eval rule for all_firewall_rules_identical_fwa_fwb, discards each entry in one firewall that has a matching entry in the second. This only leaves behind the first two tuples of fwa and fwb. In contrast, the straightforward encoding in Alloy gave a stack overflow error during the CNF generation stage.

While there has been described and illustrated a method and system for a scalable and interactive method of generating and modifying network configurations to enforce compliance with high-level requirements, it will be apparent to those skilled in the art that further modifications and variations are possible without deviating from the spirit and broad teaching of the present invention which shall be limited solely by the scope of the claims appended hereto.

What is claimed is:

1. A system for generating and modifying network configurations to enforce compliance with high-level requirements comprising:
    A processor executing:
        adaptation engine for responding to an event by providing a configuration database variable output and a requirement output that needs to be satisfied to respond to the event; and
        requirement solver that in response to receiving the outputs from said adaptation engine provides an instantiated configuration database;
        when an instantiated configuration database cannot be provided, relaxing the configuration database variable output to the requirement solver and then providing an instantiated configuration database.

2. A system as set forth in claim 1, wherein said requirement solver comprises a partial evaluator, a model-finder and a SAT solver.

3. A system as set forth in claim 2, wherein said model-finder is a Kodkod model-finder.

4. A system as set forth in claim 2, wherein said SAT solver is a ZChaff SAT solver.

5. A system as set forth in claim 2, wherein said SAT solver is a MiniSat Prover.

6. A system as set forth in claim 2, wherein said partial evaluator factors away constraints that can be solved by a special purpose constraint solver.

7. A non-transitory program storage device, readable by machine, tangibly embodying a program of instructions executable by the machine to cause the machine to perform a method for generating and modifying network configurations to enforce compliance with high-level requirements, comprising the steps of:
    receiving a network configuration database with variable;
    receiving a network requirement; partially evaluating said configuration database and requirement for generating quantifier-free constraints;
    model finding and SAT solving the quantifier-free constraints for creating a database satisfying requirements and a reconfiguration plan; and
    when the database satisfying requirements and a reconfiguration plan cannot be created, relaxing the variable and creating the database satisfying requirements and a reconfiguration plan using the relaxed variable.

8. A method of generating and modifying network configurations to enforce compliance with high-level requirements comprising the steps of:
    receiving a network configuration database with variable;
    receiving a network requirement; partially evaluating said configuration database and requirement for generating quantifier-free constraints;
    model finding and SAT solving the quantifier-free constraints for creating a database satisfying requirements; and
    when the database satisfying requirements cannot be created, relaxing the variable and creating the database satisfying requirements using the relaxed variable.

* * * * *